United States Patent Office 3,502,752
Patented Mar. 24, 1970

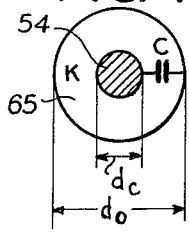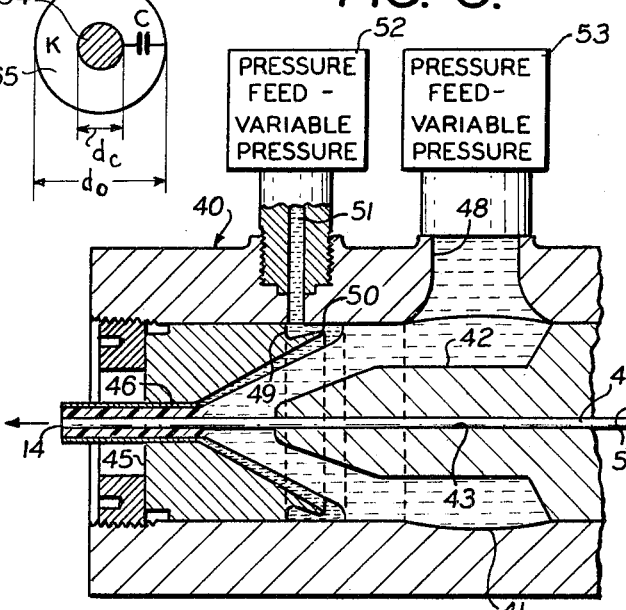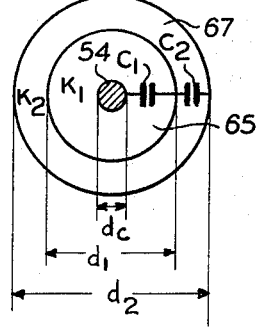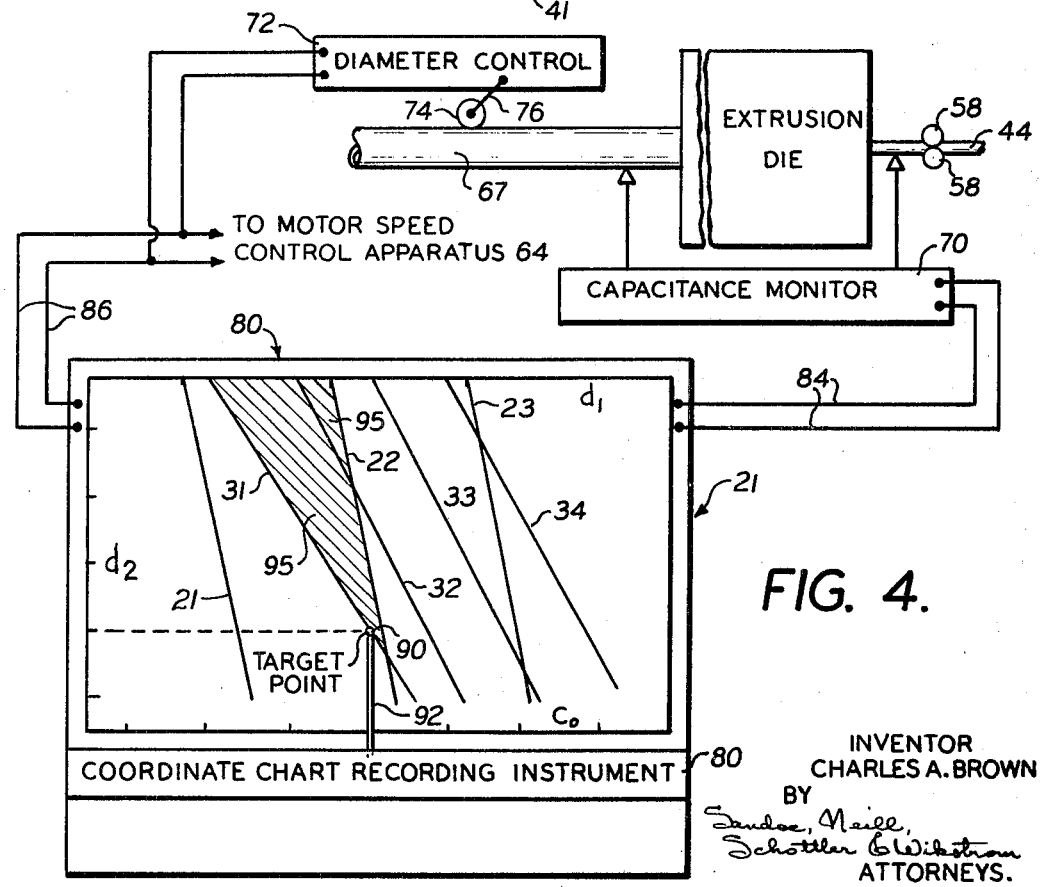

3,502,752
CONTROL OF THE DIMENSIONS OF MULTIPLE LAYERS OF EXTRUDED INSULATION
Charles A. Brown, Newark, Del., assignor to General Cable Corporation, New York, N.Y., a corporation of New Jersey
Filed Feb. 13, 1967, Ser. No. 615,598
Int. Cl. B29f 3/10, 3/06; B29h 9/08
U.S. Cl. 264—40                                    5 Claims

ABSTRACT OF THE DISCLOSURE

The dimensions of the inner and outer layers of plastic coatings, extruded over an electrical conductor, are controlled automatically in a system having a die that extrudes two layers from the same die. The control means include a monitor for the diameter of the combined coatings, and another monitor that determines the electrical capacitance per unit length of conductor. The layers are made of material having different capacitances, but when each layer is of the intended thickness, its capacitance and that of the combined layers have a known value so that, with the data from the monitors, graphs for existing conditions can be traced automatically adjacent to another graph of intended conditions to indicate any variations. The graph-producing instrument can also be used to control automatically the thickness of the layers and the overall diameter of the coated cable.

BRIEF DESCRIPTION OF INVENTION

This invention relates to methods for the extrusion of multi-layer plastic material around an electrical conductor.

The most simple cable construction is that of a single conductor upon which has been extruded a wall of an insulating material, the insulation being of substantial and uniform thickness and arranged concentrically on the conductor. In certain applications, it is desired that a cable consist of a conductor covered with a substantial wall of insulating material upon which has been extruded a thin wall, one to five mils in thickness, of another material serving as a protective jacket. Such a cable might, for example, consist of a conductor insulated by a wall of polyethylene and protected by a nylon jacket. In certain multi-layer cable constructions, it is often desirable that a thin wall of material be underlying to a wall of greater thickness. The basic similarity which exists in these multi-layer constructions is the requirement that their manufacture involve a multiple extrusion process.

There exist several known methods by which a cable consisting of an insulating wall and a jacket may be manufactured. The majority of these methods involve two separate extrusions requiring two die assemblies, one die being used for the extrusion of the insulating wall and the other die being used for the extrusion of the jacket. Several variations of this method are known, among these being a two pass operation requiring the use of two separate extruder lines, a tandem operation utilizing two extruders in the same line, and a so-called simultaneous extrusion employing two die members in a single extruder head.

U.S. Patent No. 3,229,012 assigned to General Cable Corporation discloses a unique method and apparatus whereby a laminar wall consisting of a wall of a plastic insulating material of substantial thickness and a thinner wall, one to five mils in thickness, of another plastic material may be extruded through a single die onto a moving conductor. This simultaneous extrusion insured optimum bonding of the extruded layers, this bonding resulting in a void free multi-layer construction. This method has been successfully utilized in the simultaneous extrusion of semiconducting shield and polyethylene in high voltage cables. It is important to note that this method of simultaneous extrusion may be utilized for various combinations of extrudable insulating materials.

Of major importance in the extrusion process is the ability to effectively monitor and control the thickness of the material extruded onto the conductor. The conventionally used monitor and control systems employ capacitance monitors or diameter controls to measure and control, in the extruded cable, either the capacitance per unit length or the outer diameter, respectively. These instruments are connected through servo motors to the capstan drive of the extruder by means of a potentiometer which controls the capstan speed and thus maintain within specified limits the capacitance per unit length or overall diameter of the cable by adjusting the speed of the conductor through the extruder head.

In the extrusion of a single wall of insulation onto a conductor, the monitor and control of the insulation thickness is a straightforward procedure, and may be accomplished by employing either a capacitance monitor or a diameter control system, whichever is preferable. In the extrusion of multi-layer cable, however, the problem increases in complexity. The overall diameter, in this case, is a function of the thicknesses of several layers of material, each of which may vary in thickness during the extrusion process. In the manufacture of a cable consisting of both insulation and jacket, the measurement and control of the outer diameter is not sufficient to guarantee the dimensions of each layer, but only sufficient to indicate the sum total of the insulation and jacket thicknesses. It is conceivable that in two-pass or tandem operations, the thickness of both the insulation and the jacket may be effectively monitored and controlled by the use of two diameter controls, the first such control measuring the diameter of the insulation, and the second instrument measuring the overall diameter after the extrusion of the jacket over the insulation. It should be stressed that in the simultaneous extrusion of insulation and jacket, the use of two diameter controls, as described, is not possible since the two extrusions are not physically separated.

There also exist complexities in the use of a capacitance monitor for the measurement and control of both insulation and jacket. The capacitance per unit length of such a cable construction is comprised of the capacitance contributions of two distinct insulating layers differing from each other in both thickness and dielectric constant. The problem involved is that of distinguishing between the insulation and the jacket in such a way as to measure the variations in the thickness of each, and determine the magnitude and direction of these variations. This cannot be accomplished solely by the use of a capacitance monitor.

It is an object of this invention to provide an improved method for controlling the diameter and the thickness of the different layers of a multi-layer, extruded plastic covering around an electrical conductor; for example, on a conductor having a tough plastic jacket over an underlying layer of electrical insulating material. An outstanding advantage of the invention is that it is applicable to the extrusion of different layers simultaneously from a single extrusion die.

Another object of the invention is to provide a method with instrumentation for the measurement and control of the thickness of the insulation and jacket (or other multi-layer) in a high speed extrusion line, and capable of providing a continuous and instantaneous indication of the insulation and jacket dimensions.

Other objects, features and advantages of the invention will appear or be pointed out as the description proceeds.

BRIEF DESCRIPTION OF DRAWINGS

In the drawing, forming a part hereof, in which like reference characters indicate corresponding parts in all the views;

FIGURES 1 and 2 are sectional views through conventional electrical conductors with extruded covering and with dimensions for illustrating the principle of this invention;

FIGURE 3 is a sectional view through an extrusion die for applying electrical insulation and a covering jacket simultaneously, and this figure shows diagrammatically controls for carrying out the method of this invention; and FIGURE 4 is a diagrammatic view of apparatus for controlling the diameter and thickness of a multi-layer plastic covering in accordance with this invention.

DETAILED DESCRIPTION OF INVENTION

The capacitance per unit length of a single layer insulated conductor in a conductive surrounding medium, as shown in FIGURE 1, is given by the following equation:

$$C = \frac{2\pi E_0 K}{\ln \frac{d_0}{d_c}}$$

$E_0$ = permittivity of vacuum
$K$ = relative dielectric constant of insulation
$d_0$ = outer diameter of insulated conductor
$d_c$ = conductor diameter In the case of a conductor insulated by two layers of dielectric material, as shown in FIGURE 2, the capacitance per unit length is comprised of the capacitance contributions of each layer of dielectric material as represented by FIGURE 2. The individual capacitance contribution of each layer in FIGURE 2 is expressed by the following equations:

$$C_1 = \frac{2\pi E_0 K_1}{\ln \frac{d_1}{d_c}} \qquad C_2 = \frac{2\pi E_0 K_2}{\ln \frac{d_2}{d_1}}$$

where $K_1$, $K_2$ = dielectric constants of inner and outer dielectrics, respectively
$d_1$ = outer diameter of inner dielectric
$d_2$ = outer diameter of outer dielectric (overall diameter)

The overall capacitance per unit length of the insulated conductor is given by $$C_0 = \frac{C_1 C_2}{C_1 + C_2}$$

$$= \frac{2\pi E_0 K_1 K_2}{K_1 \ln \frac{d_2}{d_1} + K_2 \ln \frac{d_1}{d_c}}$$

Since $K_1$ and $K_2$ are constants and the conductor diameter $d_c$ is essentially constant, the following mathematical functional relationships exist.

$$C_1 = f(d_1)$$
$$C_2 = f(d_1, d_2)$$
$$C_0 = f(C_1, C_2)$$

thus $$C_0 = f(d_1, d_2)$$

or $$d_1 = f(C_0, d_2)$$

By substituting values of diameters for given cable construction into the capacitance equations, calculating the overall capacitance $C_0$, and plotting the results, the outer diameter $d_1$ of the inner dielectric wall may be expressed graphically as a mathematical function of the overall capacitance per unit length $C_0$, and the overall cable diameter, $d_2$. An example of such a graphical representation is shown in FIG. 4, and is designated by the reference character 21.

By taking other constant values for the diameter $d_1$, other lines for each of the assumed constants of $d_1$ can be obtained such as the lines designated by the reference characters 22 and 23. It will be evident that any number of such lines can be obtained depending upon the number of values of $d_1$ which are to be plotted on the graphs.

For each assumed constant value of $d_1$ other values can be plotted on the graph shown in FIGURE 4 such as the total jacket thickness; that is, the thickness $d_2 - d_1/2$. Since $d_2$ is one of the variables, being measured along the ordinate of the graph, these jacket thickness plottings will produce a group of lines 31, 32, 33 and 34, each of which represents a different constant for jacket thickness and for $d_1$. The way in which these lines 21–23 and 31–34 on the graph are used will be explained more fully after a description of the control of the diameter and thickness of the extruded layers.

FIGURE 3 shows apparatus for applying extruded electrical insulation and an extruded jacket to an electrical conductor.

FIGURE 3 shows an extruding head 40 for continuously extruding a laminar wall of plastic compounds in distinct, interbonded layers onto a moving conductor or core of indefinite length. An extrusion tip 42 is supported in a conventional extruding machine die body chamber designated generally by the reference character 41. The extrusion tip 42 is provided with a longitudinal aperture 43 through which the core or conductor 44 moves, from right to left as shown in FIGURE 3. Supported in the die body chamber 41, and spaced beyond the extrusion tip 42, is an extrusion die 45 having a throat 46 which determines the final overall diameter of the extruded laminar coating.

Entry of plastic insulating material for covering the electrical conductor core 44 is made through an opening 48 the plastic material conveniently being forced into the die body chamber 41 by the usual screw feeding means, not shown. Passage of the plastic insulating material through the relatively restricted passageway between the nozzle end of the extrusion tip 42 and the throat 46 of the die 45 causes the plastic material to flow and form a compact wall around the core 44, as illustrated.

The plastic compound which is to form a thin skin on the outer surface of the thicker plastic insulating wall, and which may be conducting, is bled to the interface between the plastic insulating compound and the funnel-shaped, wall-forming surface of the die 45, around the entire periphery of the wall-forming surface, preferably adjacent to the entrance of the insulating compound into the die. References herein to bleeding a second plastic material into the interface, between the main body of plastic material being extruded on the moving core 44 and the wall-forming surface of the die, are to be construed as meaning continuously exuding under pressure a comparatively small metered amount of the second plastic material into the interface in a layer which extends around the entire periphery of the wall-forming surface. This second plastic material has the desired thickness for a jacket which is applied over the initial electrical insulating layer.

As shown, a peripheral channel 49 is formed in the outer surface of the die 45 between the leading edge of the die and the wall of the die body chamber 41 and this channel is supplied with plastic material under pressure. Th channel 49 is undercut in the manner shown to provide a relatively low resistance to the flow of compound around the die. With such a construction it is possible to maintain a substantially uniform pressure on the compound around the die and thus insure bleeding of a circumferentially uniform film of conducting compound over the bleeding edge 50 of the die to the interface between the plastic insulating compound of the first layer and the funnel-shaped, wall-forming surface of the die.

The plastic material for the outer or jacket layer is supplied to the peripheral channel 49 through a passage 51 from pressure feed mechanism 52 illustrated diagrammatically in FIGURE 3 and having provision for varying the pressure at which the plastic is supplied. By controlling the pressure of the plastic material in the passage 51, the amount of plastic material which bleeds over the edge of the die to the interface between the wall-forming surface of the die and the thicker body of plastic material on the conductor can be closely controlled.

The amount of material that bleeds over the edge 50, for any given pressure, depends upon the space between the edge 50 and the die body chamber 41. This space is shown exaggerated in the drawing for clearer illustration. By selection of suitable spacing, and of suitable pressures in the passage 51, it is possible to form, on the outer surface of the underlying plastic insulating body, a thin skin of desired thickness which in the final product may be one mil, or less, or a few mils in thickness. This thin skin of plastic material is extruded over the bare insulation in a concentric and uniform manner.

There is a controller 53 for regulating the rate of feed and pressure of the supply of plastic material that is extruded directly over the surface of the electrical conductor. When a feed screw is used, the controller 53 may control the speed of the feed screw. Thus the pressure of either supply of plastic can be controlled independently of the other to control the thickness of the respective layers, as will be more fully explained.

FIGURE 3 shows an electrical conductor 44 fed through the extrusion die by feed means 56, shown diagrammatically as rollers 58 in contact with the electrical conductor 44, and motor 60 for driving the rollers 58 through gearing 62. The rate at which the electrical conductor 44 moves through the extrusion die is determined by a motor speed control apparatus 64.

FIGURES 1 and 2 show an electrical conductor 54 with a layer of insulating material 65 extruded over the conductor. FIGURE 2 shows an outer jacket 67 made of different material from the insulating layer 65 and preferably made of tougher material for protecting the insulating layer 65 from mechanical injury. For example, the insulating layer 65 may be made of polyethylene, which has very good electrical insulating qualities; and the jacket 67 may be made of polyvinyl chloride or nylon which have less desirable electrical insulating qualities but are mechanically stronger and more resistant to abrasion than polyethylene.

The jacket 67 may be a shielding layer, particularly when the conductor 54 is to be used for high voltage. If the jacket 67 is not an insulating layer, it can be made of plastic material which is conducting. For example, it may be made of 60 parts of carbon, 50 parts of polyethylene, and 50 parts of butyl rubber, all proportions being by weight. The materials mentioned herein are given merely by way of illustration and it will be understood that any plastic materials which are suitable for coating electrical conductors and which can be extruded, may be used for this invention.

Modifications of the apparatus shown in FIGURE 3 can be used for bleeding a thin layer of plastic material under a heavier layer, instead of over it as in FIGURE 3. Such a modification is illustrated in the Garner patent, 3,229,012; and other modifications can be used for bleeding thin layers of material both under and over a thicker layer so as to apply multiple extruded layers simultaneously in a single extrusion die.

The capacitance $C_0$ can be continuously monitored with the aid of a capacitance monitor, indicated generally by the reference character 70. The overall cable diameter $d_2$ can be both monitored and controlled by employing a diameter control apparatus 72 shown in FIGURE 4 diagrammatically with a roller 74 on the end of an arm 76. The roller 74 contacts with the outside of the jacket 67 and moves to shift the arm 76 angularly in response to any changes in the overall diameter of the coated conductor. An optical or other diameter control instrument may also be used. The combined use of the capacitance monitor 70, the diameter control 72 and the chart shown in FIGURE 4 provides all of the information required for controlling the thickness of the respective layers 65 and 67 on the electrical conductor 44.

Since a continuous indication of the parameters is desired, an X-Y coordinate chart recording instrument 80 is utilized in the following manner. Both the capacitance monitor 70 and the diameter control 72 produce a direct current output voltage. The magnitude and the polarity of such voltages are dependent upon the magnitude and sign of deviations of the capacitance, or the diameter of the cable being produced, from the desired values or zero point values. These output voltages are fed to the input of the chart recording instrument 80 through conductors 84 leading from the capacitance monitor and through conductors 86 leading from the diameter control 72.

The coordinate chart recording instrument 80 has a recorder pointer 90 on the end of an arm 92 which is moved up and down by the current from the diameter control 72, and from side to side by the current from the capacitance monitor 70. Such coordinate chart recording instruments are well-known and an illustration of the mechanism of this instrument is not necessary for a complete understanding of this invention.

The chart shown on the chart recording instrument 80 is inserted into the instrument and is drawn to scale such that the incremental changes in capacitance and diameter indicated by the position of the recorder point 90 on the chart are in direct correspondence with the incremental changes in capacitance and diameter indicated by the respective monitor instruments; that is, the diameter control 72 and the capacitance monitor 70. The zero point of the recording instrument 80 is set so as to indicate the point at which all the parameters intersect with the desired values. The zero point denoted "target" in FIGURE 4 thus corresponds to zero percent deviation of both capacitance and diameter of the cable being monitored from the capacitance and diameter of a cable exhibiting the desired dimensions.

During the manufacture of a cable, this monitor and control arrangement serves as a graphical computer. Introduction of the two parameters, capacitance and diameter, causes the recording instrument to graphically solve three simultaneous equations of capacitance, the solution of said equations, namely the dimensions, being continuously displayed by the position of the recorder pointer 90. In addition, the direction of the pointer motion is indicative of the source of deviation from the target. If, for example, the recorder follows a line of constant outer dielectric thickness, this indicates variations in the inner dielectric layer. If the path of the pointer is one of constant inner dielectric diameter $d_1$, then the source of error is the outer dielectric. Appropriate adjustments of the extruder pressure, at the pressure controllers 52 and 53 (FIGURE 3), are then effected until the indicator pointer 90 is stabilized in the vicinity of the target point. The diameter control 72 is used to regulate the speed of the conductor with the motor speed regulator 64 in order to control the overall diameter of the cable. The capacitance monitor regulates the outer jacket extruder so that the relative wall thickness of the outer jacket 67 may be controlled.

To eliminate the need of reading the scale values on the chart during a production run, a shaded target area 95 (FIGURE 4) may be drawn on the chart and the boundaries of this target area are the allowable tolerances of the displayed parameters. As long as the recorder pointer remains within the target area during the extrusion process, the dimensions of the cable are within the allowable limits.

If the target area 95 is an electrical conductor and the other parts of the chart are not, then by making the pointer 90 a moving contact of an electric circuit, this pointer can control an arm to indicate that the pointer has moved out of the target area.

The method and principles herein disclosed provide a unique and effective means for measuring and controlling the insulation and jacket dimensions of a multi-layer cable construction produced by a simultaneous extrusion operation. The method may also be applied to the manufacture of multi-layer cable by two pass or tandem extrusion operations. The concepts and the instrumentation system described can be applied effectively in the prescribed manner so long as there exists a difference in the dielectric constants of the different layers surrounding the conductor. The monitor system can be employed in the extrusion process regardless of the relative thickness of the insulation jacket or the relative position of the layers with respect to the conductor.

What is claimed is:

1. The method of controlling the application to an electrical conductor of an inner layer and a jacket layer over the inner layer, the different layers being of plastic material having different capacitance characteristics, which method comprises extruding said layers over the conductor simultaneously in the same extrusion die, and monitoring the diameter of the combined layers, monitoring the capacitance of the combined layers, moving an indicator in one direction in response to variations measured by the monitoring of the diameter, moving the indicator in a different direction in response to variations measured by the monitoring of the capacitance whereby the combined travel of the indicator rates the relation to one another of the diameter and capacitance as indicated by the different monitoring operations, and controlling the thickness of one layer with respect to the other by changing the pressure at which the plastic for one layer is supplied to the die with respect to the pressure at which the other plastic is supplied to keep the indicator within limits set by lines on a capacitance-diameter graph on which one line represents correlations of the overall capacitance and overall diameter of the outer jacket and the other line respresents correlations of the overall capacitance and the thickness of one layer, both lines being based on a constant thickness of the other layer and both lines intersecting one another at a point representing a desired correlation of variables which constitute a desired target point.

2. The method described in claim 1 characterized by regulating the speed of travel of the conductor through the die to control the overall diameter of the combined layers in accordance with the diameter monitor indication.

3. The method described in claim 1 characterized by mounting transcribed graphs under the indicator, said graphs displaying curves showing the relationship between capacitance and overall diameter contained in the equation:

$$C_0 = \frac{2\pi E_0 K_1 K_2}{K_1 \ln \frac{d_2}{d_1} + K_2 \ln \frac{d_1}{d_o}}$$

$C_0$ = overall capacitance
$E_0$ = permittivity of vacuum
$K_1$, $K_2$ = dielectric constants of inner and outer dielectrics, respectively
$d_2$ = outer diameter of outer dielectric (overall diameter)
$d_1$ = outer diameter of inner dielectric
$d_c$ = conductor diameter 4. The method described in claim 3 characterized by adjusting the application of the layers to control the thickness of one or the other whenever the indicator travel is beyond limits determined by said curves, which limits represent permissible manufacturing tolerances in the coating of the conductor.

5. The method described in claim 3 characterized by controlling the extrusion of the different layers by regulating the extrusion of the outer jacket in accordance with the movement of the indicator on the graph.

References Cited

UNITED STATES PATENTS

| 2,372,162 | 3/1945 | Ryan. | |
| 2,820,987 | 1/1958 | Bunch | 264—40 |
| 3,229,012 | 1/1966 | Garner | 264—174 |

FOREIGN PATENTS

| 776,653 | 6/1957 | Great Britain. |
| 1,163,008 | 2/1964 | Germany. |

ROBERT F. WHITE, Primary Examiner

J. H. SILBAUGH, Assistant Examiner

U.S. Cl. X.R.

18—2, 13; 264—174